(12) United States Patent
DeBickes et al.

(10) Patent No.: US 10,728,237 B2
(45) Date of Patent: Jul. 28, 2020

(54) PROVIDING A SECURE COMMUNICATION PATH FOR RECEIVING A SOFTWARE UPDATE

(71) Applicant: BlackBerry Limited, Waterloo (CA)

(72) Inventors: Nicole Melissa DeBickes, Boca Raton, FL (US); Jason Lee Carter, Davie, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 197 days.

(21) Appl. No.: 15/373,715

(22) Filed: Dec. 9, 2016

(65) Prior Publication Data

US 2018/0167380 A1   Jun. 14, 2018

(51) Int. Cl.
| | |
|---|---|
| *H04L 29/06* | (2006.01) |
| *G06F 21/57* | (2013.01) |
| *H04W 12/08* | (2009.01) |
| *G06F 8/65* | (2018.01) |

(52) U.S. Cl.
CPC .......... *H04L 63/0823* (2013.01); *G06F 8/65* (2013.01); *G06F 21/57* (2013.01); *H04L 63/101* (2013.01); *H04L 63/105* (2013.01); *H04W 12/08* (2013.01)

(58) Field of Classification Search
CPC combination set(s) only.
See application file for complete search history.

(56) References Cited

U.S. PATENT DOCUMENTS

| | | | |
|---|---|---|---|
| 2003/0163728 A1 | 8/2003 | Shaw | |
| 2004/0034594 A1* | 2/2004 | Thomas | G06Q 20/02 705/39 |
| 2005/0149922 A1 | 7/2005 | Vincent | |
| 2010/0049975 A1* | 2/2010 | Parno | H04L 63/08 713/168 |
| 2011/0075843 A1* | 3/2011 | Gremaud | H04N 7/163 380/236 |
| 2015/0169311 A1* | 6/2015 | Dickerson | G06F 8/65 717/170 |
| 2015/0207914 A1* | 7/2015 | Hunt | H04M 19/047 340/407.1 |
| 2015/0319252 A1* | 11/2015 | Momchilov | H04L 67/141 709/223 |

OTHER PUBLICATIONS

U.S. Appl. No. 14/824,975, filed Aug. 12, 2015, Fach et al.
Bellissimo et al., "Secure Software Updates: Disappointments and New Challenges," Usenixx, Aug. 3, 2006, 7 pages.
Extended European Search Report issued in European Application No. 17204145.1 dated Apr. 20, 2018, 7 pages.
Communication under Rule 71 (3) EPC issued in European Application No. 17204145.1 dated Nov. 27, 2019, 9 pages.

* cited by examiner

*Primary Examiner* — Abiy Getachew
(74) *Attorney, Agent, or Firm* — Fish & Richardson P.C.

(57) ABSTRACT

Systems, methods, devices, and software can be used to send or receive a software update. In some aspects, a software update notification is received at an electronic device. The software update notification indicates a security requirement. A network connection determined to be secure for receiving a software update based on the security requirement. The software update is downloaded using the network connection.

35 Claims, 3 Drawing Sheets

PROVIDING A SECURE COMMUNICATION PATH FOR RECEIVING A SOFTWARE UPDATE

TECHNICAL FIELD

The present disclosure relates to providing a secure communication path for receiving a software update.

BACKGROUND

In some cases, electronic devices, including mobile devices or other computer systems, can receive software updates to update software programs installed on the electronic device. In the context of software, a package is an upgradeable item of content or data associated with one or more components of a software program. Examples of a package can include a calibration file, a configuration file, a patch, an operation system file, or any combinations thereof. In some cases, packages for the same version or release of a software program can be grouped in a software update.

DESCRIPTION OF DRAWINGS

Like reference numbers and designations in the various drawings indicate like elements.

DETAILED DESCRIPTION

In some cases, an electronic device can be associated with an enterprise, e.g., an organization in the private sector or public sector, such as a corporate entity, government entity, academic institution, medical or healthcare organization, or non-profit-organization. Further examples of an enterprise include without limitation, a business, corporation, school, college, university, government agency, law enforcement agency, hospital, home, residence, and family. In some cases, the enterprise can establish specific security procedures for the electronic device. Alternatively or additionally, a user or a family member, e.g., a parent, of the user of electronic device can establish the security procedure, e.g., parental control features, for the electronic device. The security procedures can be related to different aspects of operation of file access on the electronic device, software program installation and execution, network connection.

In some cases, a software update for a software program installed on the electronic device can be available. In some cases, the enterprise can test the software update to confirm that the software update is secure. Therefore, the enterprise can instruct the electronic device to install the software update. In some cases, the enterprise can store the software update on its server. Therefore, the electronic device can install the software update using a secure network connection between the enterprise and the electronic device to download the software update.

However, in some cases, the enterprise does not store the software update. In these or other cases, the software update can be stored on a software update server. The software update server can include a server used by the software vendor that develops the software program and the update, an application store that sells the software program and the update, or any other third party server. The electronic device therefore will connect to the software update server to download the software update.

In some cases, the connection between the electronic device and the software update server may not be secure. For example, the electronic device can connect to an access point that further connects to the software update server. The access point can be a malicious node that generates a man-in-the-middle attack. Additionally or alternatively, other network nodes that the connection routes through in the network may be a malicious node or is susceptible to attack. For example, an electronic device might attempt to update its software via a hotel network, public WiFi network, or other unsecure or untrusted network or access point. In these or other cases, the malicious node can send a software update with malicious content to the electronic device, and therefore can create a risk of security exposure in the electronic device. It may be beneficial for an enterprise to avoid this risk.

In some cases, based on the size of the software update, the electronic device can be configured to select a network connection with a particular bandwidth to download the software update. However, a network connection with a bandwidth that is suitable for the size of the software update may not meet a security requirement set by the enterprise.

Figure 1:
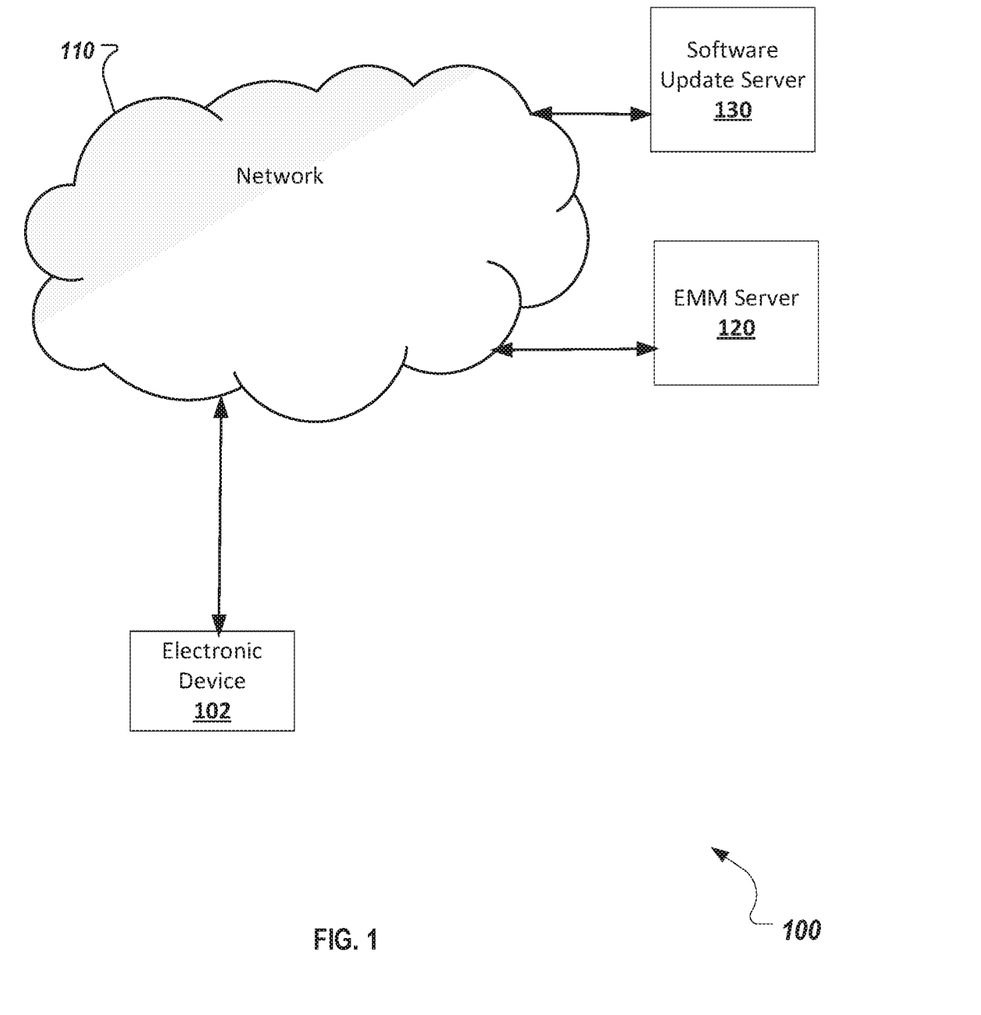
FIG. 1 is an example communication system that receives a software update according to an implementation.
Figure 2:
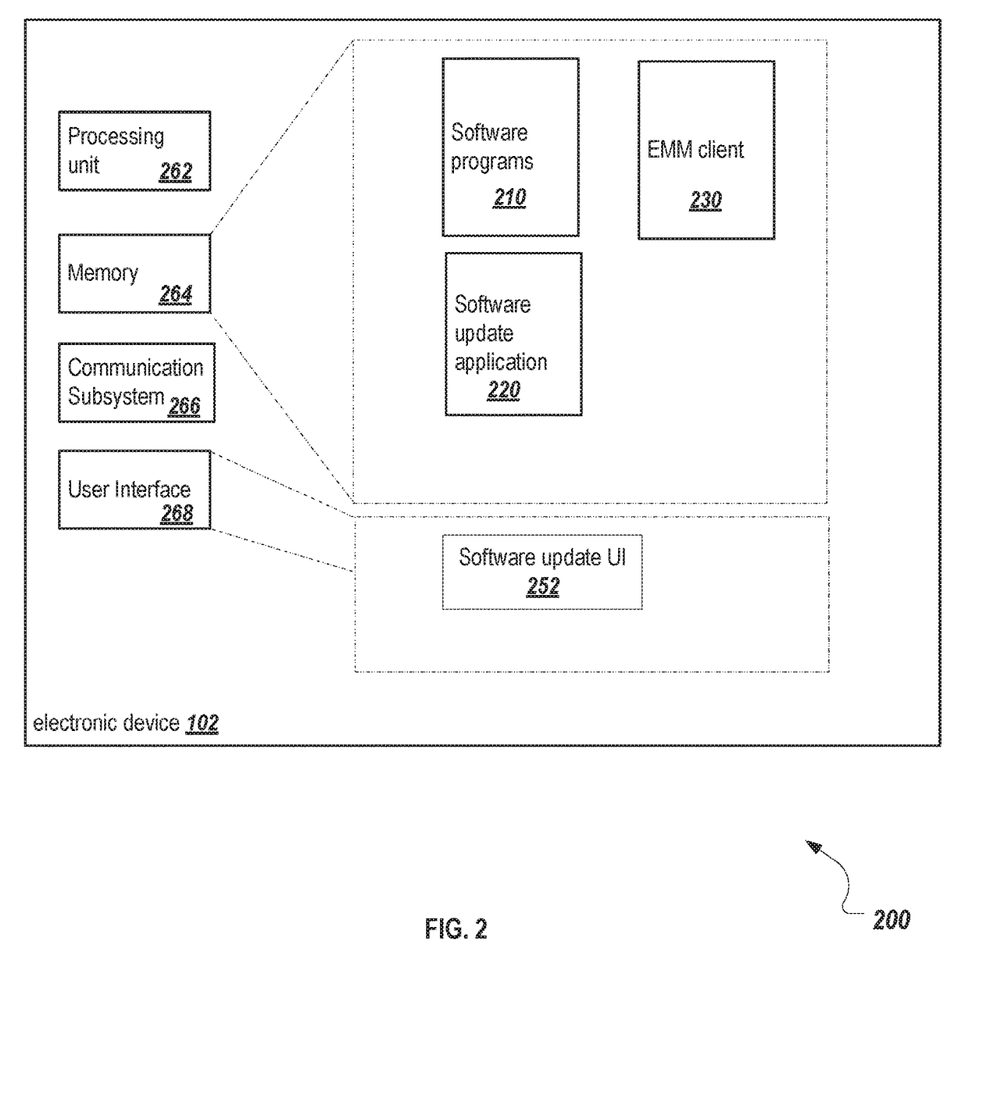
FIG. 2 is a schematic diagram showing an electronic device that receives a software update according to an implementation.
Figure 3:
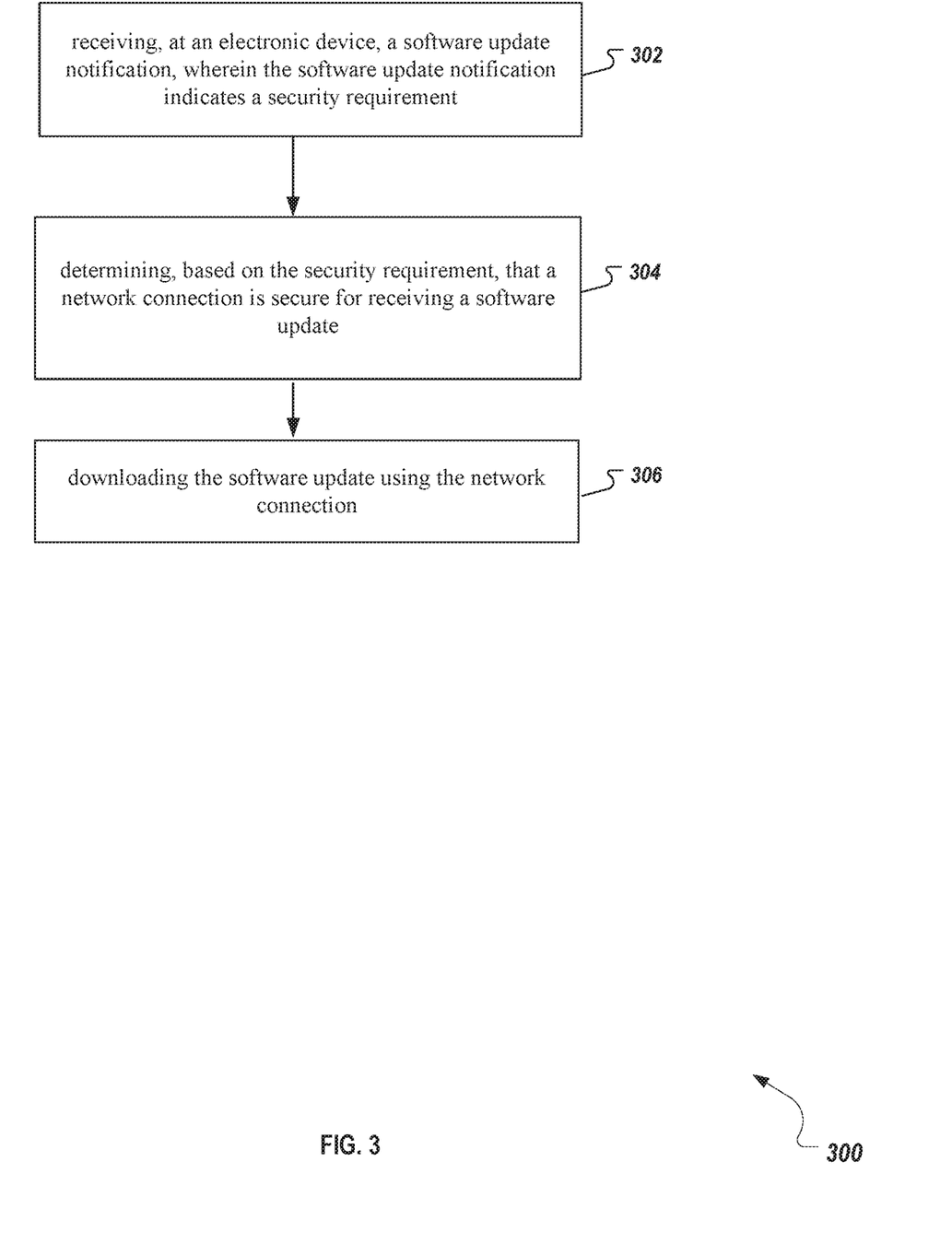
FIG. 3 is a flow diagram showing an example process for receiving a software update according to an implementation.

In some cases, a software update notification can be received at an electronic device. The software update notification can indicate a security requirement. A network connection can be determined, based on the security requirement, to be secure for receiving a software update. The software update can be downloaded using the network connection. FIGS. 1-3 and associated descriptions provide additional details of these implementations.

FIG. 1 is an example communication system 100 that receives a software update according to an implementation. At a high level, the example communication system 100 includes an electronic device 102 that is communicably coupled with a first server 120 and a second server 130 over a network 110. In the example shown, the first server 120 comprises an EMM (Enterprise Mobility Management) server and the second server 130 comprises a software update server. In some cases, the first server 120, the second server 130, or a combination thereof can be implemented on a cloud platform.

The software update server 130 represents an application, set of applications, software, software modules, hardware, or any combinations thereof that provide software updates. In some cases, the software update server 130 can include an application store or an application market that stores applications and application updates for the electronic device 102 to download. Alternatively or in combination, the software update server 130 can include a vendor server of a vendor that provides the operation system (OS) or the firmware for the electronic device 102.

The EMM server 120 represents an application, a set of applications, software, software modules, hardware, or any combination thereof that can be configured to manage applications and devices for an enterprise. For example, the EMM server 140 can install, update, and manage the license of enterprise applications on the electronic device 102. The EMM server 140 can also manage security of the electronic device 102.

The example communication system 100 includes the network 110. The network 110 represents an application, set of applications, software, software modules, hardware, or any combinations thereof that can be configured to provide communications for one or more devices in FIG. 1, e.g., the electronic device 102, the software update server 130, the EMM server 120, or a combination thereof. The network 110 includes a wireless network, a wireline network, or a combination thereof. For example, the network 110 can include an Ethernet cable, a copper wire, an optical fiber, or any other wireline communication components.

The network 110 can also include one or a plurality of radio access networks (RANs), core networks (CNs), and external networks. The RANs may comprise one or more radio access technologies. In some implementations, the radio access technologies may include Long Term Evolution (LTE), LTE-Advanced (LTE-A), Global System for Mobile communication (GSM), Enhanced Data rates for GSM Evolution (EDGE), Interim Standard 95 (IS-95), Code Division Multiple Access (CDMA) 2000, Evolution-Data Optimized (EVDO), Universal Mobile Telecommunications System (UMTS), or Evolved Universal Mobile Telecommunications System (E-UMTS), Wireless Local Area Network (WLAN), Bluetooth. In some instances, the core networks may comprise evolved packet cores (EPCs).

A RAN is part of a wireless telecommunication system which implements one or more radio access technologies, such as GSM, EDGE, UMTS, E-UMTS, CDMA2000, EVDO, 3GPP LTE, 3GPP LTE-A, WLAN, Bluetooth, or any combinations thereof. In many applications, a RAN includes at least one base station. A base station may be a radio base station that may control all or at least some radio-related functions in a fixed part of the system. The base stations may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

The electronic device 102 represents an application, set of applications, software, software modules, hardware, or any combinations thereof that can be configured to receive software updates. FIGS. 2-3 and associated descriptions provide additional details of these implementations.

In operation, the electronic device 102 receives a software update notification from the EMM server 120. The software update notification can include a security requirement for a network connection for receiving software update. The electronic device 102 determines that the network connection between the electronic device 102 and the software update server 130 over the network 110 meets the security requirement. If the security requirement is met, the electronic device 102 downloads the software update from the software update server 130 and performs the software update using the downloaded software update. FIGS. 2-3 and associated descriptions provide additional details of these implementations.

While elements of FIG. 1 are shown as including various component parts, portions, or modules that implement the various features and functionality, these elements may instead include a number of sub-modules, third-party services, components, libraries, and such, as appropriate. Furthermore, the features and functionality of various components can be combined into fewer components as appropriate.

FIG. 2 is a schematic diagram 200 showing the electronic device 102 that receives a software update according to an implementation. In some cases, the electronic device 102 can be used to perform the function as the electronic device 102 shown in FIG. 1. The electronic device 102 includes a processing unit 262, a communication subsystem 266, a user interface 268, and a memory 264. An electronic device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. In some cases, the processing unit 262 can also be configured to make a radio resource management (RRM) decision, such as cell selection/reselection information, or trigger a measurement report. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple input multiple output (MIMO) transmissions. In some implementations, the receivers in the communication subsystem 266 can be an advanced receiver or a baseline receiver. Two receivers can be implemented with identical, similar, or different receiver processing algorithms.

The example user interface 268 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 2, the example user interface 268 can be configured to present a software update user interface 252. The software update user interface 252 represents a graphic user interface that outputs one or more user interface objects for receiving a software update. For example, the software update user interface 252 can include one or more user interface objects that indicate to the user a software update is available, request the user for establishing a network connection to receive the software update, indicate to the user that the current network connection is not secure enough to receive the software update, request the user to disconnect the current connection and establish a more secure connection, or any other user interactions for receiving software updates. FIG. 2 and associated descriptions provide additional details of these implementations.

The example memory 264 can be a computer-readable storage medium on the electronic device 202. Examples of the memory 264 include volatile and non-volatile memory, magnetic media, optical media, random access memory (RAM), read-only memory (ROM), removable media, and others. The memory 264 can store an operating system (OS) of electronic device 202 and various other computer-executable software programs for performing one or more of the processes, steps, or actions described above.

As shown in FIG. 2, the example memory 264 can include one or more software programs 210. The software programs 210 include programs, modules, scripts, processes, or other objects that can execute on the electronic device 102. For example, software programs 210 can include the operation system (OS) executing on the electronic device 102, firmware of the electronic device 102, enterprise or personal applications installed on the electronic device 102.

The example memory 264 can include a software update application 220. The software update application 220 represents an application, set of applications, software, software modules, hardware, or any combinations thereof that can be configured to apply updates on one or more software programs 210. In one example, the software update application 220 can be a component of the OS of the electronic device 102.

The example memory 264 can also include a client 230. In the example shown, the client 230 comprises an EMM client. The EMM client 230 represents an application, set of applications, software, software modules, hardware, or any combinations thereof that can be configured to manage enterprise services on the electronic device 102. In some cases, the EMM client 230 can communicate with an EMM server over the network to manage enterprise services on the electronic device 102. For example, the EMM client 230 can create an enterprise workspace on the electronic device 102. The EMM client 230 can also configure the enterprise applications operating on the electronic device 102. In some cases, the EMM client 230 can receive a software update notification from the EMM server. The EMM client 230 can determine whether the network connection meets the security requirement indicated in the software update notification. If the network connection meets the security requirement, the EMM client 230 can initiate the downloading and installation of the software update using the network connection. The downloaded software update can be sent to the software update application 220 to perform the software update procedure. FIG. 3 and associated descriptions provide additional details of these implementations.

Turning to a general description, an electronic device, e.g., the electronic device 102, may include, without limitation, any one or more of the following: computing device, mobile device, mobile electronic device, user device, mobile station, subscriber station, portable electronic device, mobile communications device, wireless modem, wireless terminal, television, printer or other peripheral, vehicle, electronic appliance, or any other electronic device capable of sending and receiving data. Examples of a mobile device may include, without limitation, any one or more of the following: a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 3 is a flow diagram showing an example process 300 for receiving a software update according to an implementation. The process 300 can be implemented by an electronic device, e.g., the electronic device 102 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, where a software update notification is received at an electronic device. The software update notification can indicate that an update for at least one software program installed on the electronic device is available. The at least one software program can include one or more applications installed on the electronic device, one or more components of an operation system (OS) that executes on the electronic device, a firmware of the electronic device, a configuration file, a data set, or any combinations thereof. In some cases, the software update notification is sent from an EMM server that manages the electronic device for an enterprise. In some cases, the EMM server can determine that the update is secure based on the security protocols or procedures of the enterprise. In response to determining that the update is secure, the EMM server sends the software update notification to the electronic device that is associated with the enterprise.

In some cases, the update is available at a software update server. In these or other cases, the software update notification can include an indication that identifies the software update server. Examples of the indication can include an Internet Protocol (IP) address of the software update server, the Uniform Resource Locator (URL) of the software update server, or any other information that identifies the software update server.

In some cases, the software update notification also indicates one or more security requirements for receiving the software update. The one or more security requirements can be used to determine whether a network connection for receiving the software update is secure. In some cases, the one or more security requirements can be set by the EMM server based on the security protocols or procedures of the enterprise.

In some cases, the one or more security requirements can include a certificate requirement. In some cases, a certificate can be used to authenticate the holder of the certificate. For example, when a connection for receiving the software update is established between the electronic device and a network node, e.g., an access point in the network that connects the electronic device to the software update server, the electronic device can receive the certificate of the network node. The electronic device can verify that the certificate is valid and therefore authenticate the network node before using the connection. The certificate of the network node can be issued by a Certificate Authority (CA), a subordinate CA, or a combination thereof.

In some cases, the certificate requirement can include a criteria on the type of certificate provided by the network node for authentication. In some cases, the type of the certificate can include a domain-validated (DV) certificate, an Extended Validation (EV) certificate, or an Organization Validation (OV) certificate. A DV certificate is an X.509 digital certificate typically used when the identity of the certificate holder has been validated by proving a control over a domain. The issuance of a DV certificate does not assure that any particular legal entity is connected to the certificate, even if the domain name may imply that a particular legal entity controls the domain. An EV certificate can be issued by a certificate authority (CA) that passes an independent qualified audit review. To issue an EV certificate to a network node, the CA validates the legal identity of the network node, that the network node is the domain name owner or has exclusive control over the domain name, and confirms the identity and authority of the individuals operating the network node. The EV certificate provides stronger security than the DV certificate. The security strength of an OV certificate falls between that of EV and DV. To issue an OV to a network node, the CA can validate that the network node has the right of the applicant to use the domain name and conduct some vetting of the organization. The certificate requirement can indicate whether a DV certificate, an OV certificate, an EV certificate, or any combinations thereof are required to be provided by the network node to authenticate the network node for the network connection between the network node and the electronic device.

Alternatively or in combination, the certificate requirement can include one or more criteria on the CAs that issue the certificate. In one example, the certificate requirement can indicate a white list. The white list can include a list of CAs that issue trustworthy certificates. If the certificate provided by the network connection is issued by a CA on the white list, the certificate requirement is met. In another example, the certificate requirement can indicate a black list. The black list can include a list of CAs that do not issue trustworthy certificates. If the certificate provided by the network connection is issued by a CA on the black list, the certificate requirement is not met.

In some cases, the one or more security requirements can include an encryption requirement. The security strength level of a connection can be related to the strength of the encryption used for the connection. For example, the connection can use no encryption, 128-bit encryption, 256-bit encryption, or other types of encryption, each providing a different level of security strength. The encryption requirement can indicate the minimum level of encryption that is required for the network connection.

In some cases, the s one or more security requirements can include a network connection profile requirement. The network connection profile requirement can indicate the connection profile used to establish the network connection for receiving the software update. In some cases, the electronic device can use a connection profile to establish a network connection. The connection profile represents a file, an application, a set of applications, software, software modules, hardware, or any combinations thereof that can be configured to store configuration information for a connection. Examples of configuration information in a connection profile can include the Internet Protocol (IP) address of a network node to be connected with the electronic device, communication protocols for the network node, security settings for the network node, user credentials, e.g., username and password, associated with the network node, gateway type of the network node, server and client authentication type of the connection, Domain Name Server (DNS) for the network node, and certificate of the electronic device used to establish connection to the network node. In some cases, the connection profile can be pushed, updated, or deleted by the EMM server. In one example, the connection profile can be a Virtual Private Network (VPN) profile that stores configuration information for a connection to a VPN server. In another example, the connection profile can be a wireless local area network (WLAN) profile that is used to establish a connection over a WLAN access point. In some cases, the software update notification can indicate a VPN connection profile to be used to establish connection for receiving the software update. Alternatively or in combination, the software update notification can indicate a WLAN connection profile, e.g., used to establish a corporate Wi-Fi connection on the premise of a corporation, to be used to establish connection for receiving the software update.

At 304, in response to receiving the software update notification, the electronic device determines whether the network connection between the electronic device and the software update server is secure for receiving the software update. In some cases, the electronic device is not connected to the network. In these or other cases, the electronic devices establishes the network connection for receiving the software update before determining the security of the network connection. In one example, a user interface element or object, e.g., an icon, a dialogue box, a message, can be outputted on the electronic device to indicate that a software update is available. In some cases, the user can select, e.g., using a click, a touch, a swipe, or any other user interface inputs, to establish a network connection for receiving the software update. In some cases, the electronic device can use the information included in the software update notification, e.g., the network connection profile indicated in the software update notification, to establish the network connection.

The electronic device can compare the security requirement indicated in the software update notification with the configuration of the network connection to determine whether the network connection is secure. For example, the electronic device can determine whether the certificate received from the network node of the network connection meets the certificate requirement, whether the encryption level of the network connection meets the encryption requirement, whether the connection profile used to establish the connection is included in the network connection profiles identified in software update notification.

At 306, in response to determining that the network connection meets the security requirement, the electronic device downloads the software update using the network connection. The electronic device can perform the software update procedure using the received software update.

In some cases, the electronic device can determine that the network connection fails to meet the security requirement. In these or other cases, a notification can be outputted on the electronic device to inform the user that the current network connection is not secure enough to download the software update. In some cases, the electronic device can disconnect the current network connection and establish a different network connection for receiving the software update. Alternatively, the electronic device can wait until a different network connection is established and determine whether the different network connection meets the security requirement for receiving the software update. In some cases, the electronic device can receive a user input to determine whether to disconnect the current connection or wait for the next connection.

In some cases, when a network connection is disconnected during the download, the electronic device can reconnect to the network and resume the download. Alternatively, e.g., if the download is for a software update of the OS on the electronic device, the electronic device can discard the partially downloaded software update, re-establish a network connection, determine that the new connection is secure, and re-start the download of the software update.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n, 802.11p, or 802.20 (or any combination of 802.11x, 802.11p, and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
 receiving, at an electronic device, a software update notification for a software upgrade that upgrades software on the electronic device, wherein the software update notification comprises a security requirement, and the security requirement comprises at least one of a certificate requirement or an encryption requirement for evaluating a security level of a network connection used to receive the software update;

determining, by the electronic device, based on the at least one of the certificate requirement or the encryption requirement, that a network connection is secure for receiving the software update, wherein the determining that the network connection is secure comprises comparing a certificate or an encryption of the network connection with the at least one of the certificate requirement or the encryption requirement included in the software update notification; and in response to determining that the network connection is secure, downloading, by the electronic device, the software update using the network connection.

2. The method of claim 1, wherein the software update notification identifies a server storing the software update.

3. The method of claim 1, wherein the software update notification is received from an enterprise mobility management (EMM) server associated with the electronic device.

4. The method of claim 1, wherein the security requirement comprises the certificate requirement, and determining that the network connection is secure comprising determining that the certificate requirement is met for the network connection.

5. The method of claim 1, wherein the security requirement identifies a network connection profile that is used to establish the network connection.

6. The method of claim 1, wherein the software update is used to update an operation system (OS) that executes on the electronic device.

7. The method of claim 1, further comprising, establishing the network connection based on the security requirement.

8. An electronic device, comprising:
a memory; and
at least one hardware processor communicatively coupled with the memory and configured to:
receive, at the electronic device, a software update notification for a software upgrade that upgrades software on the electronic device, wherein the software update notification comprises a security requirement, and the security requirement comprises at least one of a certificate requirement or an encryption requirement for evaluating a security level of a network connection used to receive the software update;

determine, by the electronic device, based on the at least one of the certificate requirement or the encryption requirement, that a network connection is secure for receiving the software update, wherein the determination that the network connection is secure comprises comparing a certificate or an encryption of the network connection with the at least one of the certificate requirement or the encryption requirement included in the software update notification; and in response to determining that the network connection is secure, download, by the electronic device, the software update using the network connection.

9. The electronic device of claim 8, wherein the software update notification identifies a server storing the software update.

10. The electronic device of claim 8, wherein the software update notification is received from an enterprise mobility management (EMM) server associated with the electronic device.

11. The electronic device of claim 8, wherein the security requirement comprises the certificate requirement, and determining that the network connection is secure comprising determining that the certificate requirement is met for the network connection.

12. The electronic device of claim 8, wherein the security requirement identifies a network connection profile that is used to establish the network connection.

13. The electronic device of claim 8, wherein the software update is used to update an operation system (OS) that executes on the electronic device.

14. The electronic device of claim 8, wherein the at least one hardware processor is configured to establish the network connection based on the security requirement.

15. A non-transitory computer-readable medium containing instructions which, when executed, cause an electronic device to perform operations comprising:
receiving, at the electronic device, a software update notification for a software upgrade that upgrades software on the electronic device, wherein the software update notification comprises a security requirement, and the security requirement comprises at least one of a certificate requirement or an encryption requirement for evaluating a security level of a network connection used to receive the software update;

determining, by the electronic device, based on the at least one of the certificate requirement or the encryption requirement, that a network connection is secure for receiving the software update, wherein the determining that the network connection is secure comprises comparing a certificate or an encryption of the network connection with the at least one of the certificate requirement or the encryption requirement included in the software update notification; and in response to determining that the network connection is secure, downloading, by the electronic device, the software update using the network connection.

16. The computer-readable medium of claim 15, wherein the software update notification identifies a server storing the software update.

17. The computer-readable medium of claim 15, wherein the software update notification is received from an enterprise mobility management (EMM) server associated with the electronic device.

18. The computer-readable medium of claim 15, wherein the security requirement comprises the certificate requirement, and determining that the network connection is secure comprising determining that the certificate requirement is met for the network connection.

19. The computer-readable medium of claim 15, wherein the security requirement identifies a network connection profile that is used to establish the network connection.

20. The computer-readable medium of claim 15, wherein the software update is used to update an operation system (OS) that executes on the electronic device.

21. A method, comprising:
transmitting, from an enterprise mobility management (EMM) server to an electronic device, a software update notification that upgrades software on a software upgrade of the electronic device, wherein
the software update notification comprises a security requirement,
the security requirement comprises at least one of a certificate requirement or an encryption requirement for evaluating a security level of a network connection used to receive the software update, and the at least one of the certificate requirement or the encryption requirement included in the software update notification is used by the electronic device to compare with a certificate or an encryption of the network connection to determine whether the network connection is secure for the electronic device to receive the software update.

22. The method of claim 21, wherein the software update notification identifies a server storing the software update.

23. The method of claim 21, wherein the security requirement comprises the certificate requirement for the network connection.

24. The method of claim 21, wherein the security requirement identifies a network connection profile that is used to establish the network connection.

25. The method of claim 21, wherein the software update is used to update an operation system (OS) that executes on the electronic device.

26. A enterprise mobility management (EMM) server, comprising:
   a memory; and
   at least one hardware processor communicatively coupled with the memory and configured to:
   transmit, from the EMM server to an electronic device, a software update notification that upgrades software on a software upgrade of the electronic device, wherein
   the software update notification comprises a security requirement,
   the security requirement comprises at least one of a certificate requirement or an encryption requirement for evaluating a security level of a network connection used to receive the software update, and
   the at least one of the certificate requirement or the encryption requirement included in the software update notification is used by the electronic device to compare with a certificate or an encryption of the network connection to determine whether the network connection is secure for the electronic device to receive the software update.

27. The EMM server of claim 26, wherein the software update notification identifies a server storing the software update.

28. The EMM server of claim 26, wherein the security requirement comprises the certificate requirement for the network connection.

29. The EMM server of claim 26, wherein the security requirement identifies a network connection profile that is used to establish the network connection.

30. The EMM server of claim 26, wherein the software update is used to update an operation system (OS) that executes on the electronic device.

31. A non-transitory computer-readable medium containing instructions which, when executed, cause an enterprise mobility management (EMM) server to perform operations comprising:
   transmitting, from the EMM server to an electronic device, a software update notification that upgrades software on a software upgrade of the electronic device, wherein
   the software update notification comprises a security requirement,
   the security requirement comprises at least one of a certificate requirement or an encryption requirement for evaluating a security level of a network connection used to receive the software update, and
   the at least one of the certificate requirement or the encryption requirement included in the software update notification is used by the electronic device to compare with a certificate or an encryption of the network connection to determine whether the network connection is secure for the electronic device to receive the software update.

32. The non-transitory computer-readable medium of claim 31, wherein the software update notification identifies a server storing the software update.

33. The non-transitory computer-readable medium of claim 31, wherein the security requirement comprises the certificate requirement for the network connection.

34. The non-transitory computer-readable medium of claim 31, wherein the security requirement identifies a network connection profile that is used to establish the network connection.

35. The non-transitory computer-readable medium of claim 31, wherein the software update is used to update an operation system (OS) that executes on the electronic device.

* * * * *